United States Patent [19]

Kawamura

[11] 4,261,317
[45] Apr. 14, 1981

[54] ANTI-AFTER BURN SYSTEM FOR INTERNAL COMBUSTION ENGINE

[75] Inventor: Toshihiko Kawamura, Toyoake, Japan

[73] Assignee: Nippondenso Co., Ltd., Kariya, Japan

[21] Appl. No.: 65,327

[22] Filed: Aug. 8, 1979

[30] Foreign Application Priority Data

Aug. 18, 1978 [JP] Japan .............................. 53-113903[U]

[51] Int. Cl.³ ............................................ F02M 23/04
[52] U.S. Cl. ...................................... 123/587; 261/63
[58] Field of Search ................... 123/587, 585; 261/63

[56] References Cited

U.S. PATENT DOCUMENTS

| 2,969,800 | 1/1961 | Skiruin | 123/585 |
| 4,195,602 | 4/1980 | Yamashuta | 123/587 |
| 4,196,709 | 4/1980 | Toryu | 123/587 |

Primary Examiner—Ronald H. Lazarus
Attorney, Agent, or Firm—Cushman, Darby & Cushman

[57] ABSTRACT

An anti-after burn system for an internal combustion engine has an air passage for feeding an additional air into the engine intake manifold and a valve member disposed in the air passage for the control of the supply of the additional air to the engine. The valve member is actuated by a valve actuator having a diaphragm disposed between two vacuum chambers one of which is pneumatically connected to the intake manifold and the other is communicated with the one chamber through a restricted orifice formed in the diaphragm. When the difference in pressure between the vacuum chambers exceeds a predetermined value, the valve member is opened to allow air to flow into the intake manifold for a time period. The two vacuum chambers are also pneumatically connected by a vacuum passage in which a relief valve is provided and is opened when the difference in pressure between the two chambers exceeds a second predetermined value greater than the first-mentioned predetermined value, to thereby promptly decrease the pressure difference to the first predetermined value and thus promptly interrupt the air supply into the engine.

3 Claims, 2 Drawing Figures

ANTI-AFTER BURN SYSTEM FOR INTERNAL COMBUSTION ENGINE

BACKGROUND OF THE INVENTION

1. Field of the Invention

The present invention relates to an anti-after burn system for an internal combustion engine and, more particularly, to a system operative to supply additional air into an intake system of an internal combustion engine when the engine intake vacuum exceeds a predetermined vacuum level to prevent an after burn which would otherwise occur due to an excessively rich air-fuel mixture fed into the engine.

2. Description of the Prior Art

A prior art system of the class specified above has an anti-after burn valve which is opened and closed in response to variation in the engine intake vacuum. The valve open period is dependent on the magnitude of the variation in the engine intake vacuum. When the engine is started, the vacuum level in the intake manifold of the engine is widely varied from a level substantially equal to the atmospheric pressure to a high vacuum level, so that the anti-after burn valve is opened for a long period of time during which the additional air is fed into the intake manifold of the engine, resulting in the occurence of an engine stall or poor engine starting capability.

SUMMARY OF THE INVENTION

It is an object of the present invention to provide an improved anti-after burn system for an internal combustion engine in which the anti-after burn valve is opened for a shortened period of time even when the engine intake manifold is widely or extensively varied, thereby to assure a reliable engine starting.

According to the present invention, there is provided an anti-after burn system for an internal combustion engine having an intake system with a throttle valve disposed therein, said system comprising:

an air passage for feeding air into the engine intake system;

an anti-after burn valve means including a first valve seat provided in said air feeding passage, a first valve member disposed in said air feeding passage and a valve actuator having first and second vacuum chambers and a diaphragm disposed therebetween and operatively connected to said first valve member;

said first and second vacuum chambers being pneumatically connected to the engine intake system such that the intake manifold vacuum is introduced directly into said first vacuum chamber while the intake manifold vacuum is introduced into said second vacuum chamber through a restricted orifice so that a difference in pressure is momentarily produced between said first and second vacuum chambers when the intake manifold vacuum is varied;

said diaphragm being operative to move said first valve member to its open position when the difference in pressure between said first and second vacuum chambers exceeds a first predetermined value;

means defining a vacuum passage extending between said first and second vacuum chambers; and a relief valve means including a second valve seat provided in said vacuum passage, a second valve member disposed in said vacuum passage and a spring member normally urging said second valve member against said second valve seat, the arrangement being such that said second valve member is moved to its open position against said spring member to communicate said first vacuum chamber with said second vacuum chamber when said pressure difference exceeds a second predetermined value which is greater than said first predetermined value.

The above and other objects, features and advantages of the present invention will be made more apparent by the following description with reference to the accompanying drawings.

DESCRIPTION OF PREFERRED EMBODIMENTS

Figure 1:
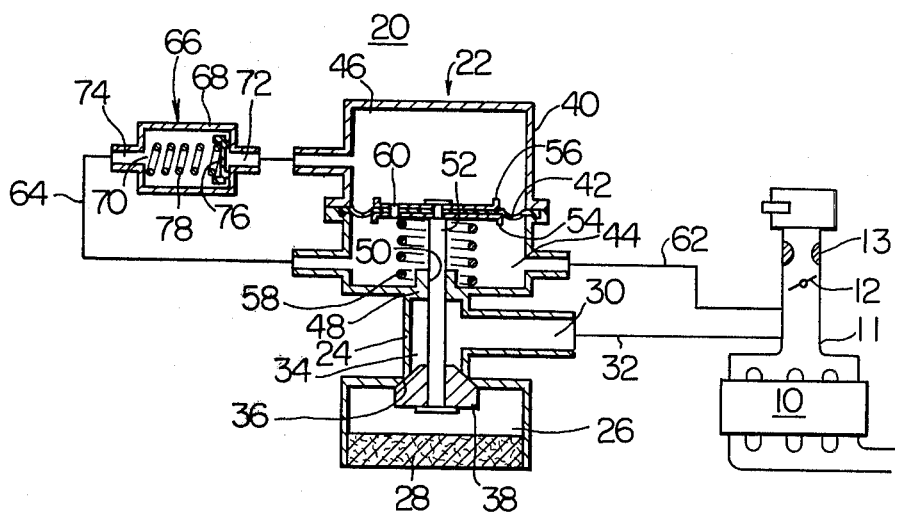
FIG. 1 is a partly sectional diagrammatic illustration of an embodiment of the anti-after burn system according to the present invention.

Referring first to FIG. 1, an internal combustion engine generally indicated by 10 has an intake system 11 with a throttle valve 12 provided therein downstream of a carburetor 13. The engine 10 is equipped with an anti-after burn system generally designated by 20 and including an anti-after burn valve 22 comprising a housing 24 which defines therein an air inlet port 26 in which an air filter element 28 is disposed at the outer end of the inlet port 26. The housing also defines therein an air outlet port 30 which is connected by a conduit 32 to the engine intake system 11 downstream of the throttle valve 12. The air inlet and outlet ports 26 and 30 are connected by a passage 34 also defined in the housing 24. The air inlet port 26 and the passage 34 are axially aligned with each other. The air inlet port 26 has a diameter greater than that of the passage 34 to provide an annular shoulder having an inner peripheral edge 36 which is bevelled to provide a valve seat for a valve member 38 which is disposed in the air inlet port 26 for axial movement therein.

The end of the housing 24 opposite to the air inlet port 26 is formed into a generally cup-shaped structure having a flanged-peripheral edge which cooperates with a similarly cup-shaped cover member 40 to sealingly clamp or hold a diaphragm 42 at its marginal or peripheral edge portion so that the housing 24, the cover 40 and the diaphragm 42 cooperate together to define first and second chambers 44 and 46. The chamber 44 is separated from the passage 34 by an end wall 48 of the housing 24. The end wall 48 is formed therein with a through-hole 50 through which slidably and sealingly extends a valve rod 52 having its one end secured to the valve member 38. The other end of the valve rod 52 is secured to the diaphragm 42 by means of discs 54 and 56 attached to the opposite sides of the diaphragm. The first and second chambers 44 and 46 will be called "first and second vacuum chambers" for the reason to be made apparant later. A compression coil spring 58 is disposed in the first vacuum chamber 44 and extends between the disc 54 and the housing end wall 48 to normally resiliently bias the diaphragm 42 towards the second vacuum chamber 46 so that the valve member 38 is urged into sealing engagement with the valve seat 36. The first and second vacuum chambers 44 and 46 are communicated with each other through restricted or small orifice or aperture 60 formed in the diaphragm 42 and the discs 54 and 56. The first vacuum chamber 44 is pneumatically connected to the engine intake system 11 downstream of the throttle valve 12 through a vacuum conduit 62 so that the engine intake vacuum is introduced through the vacuum conduit 62 into the vacuum chamber 44. The vacuum in the vacuum chamber 44 is introduced through the orifice 60 into the second vacuum chamber 46.

The first and second vacuum chambers 44 and 46 are also pneumatically connected by a bypass vacuum passage 64 extending between the chambers in bypassing relationship to the orifice 60. A relief valve 66 is provided in the bypass vacuum passage 64 and comprises a substantially closed housing 68 which defines therein a chamber 70 having air inlet and outlet ports 72 and 74 formed in the opposite end walls of the housing 68. A valve member 76 is disposed in the chamber 70 adjacent to the air inlet port 72. A compression coil spring 78 is disposed in the chamber 70 and extends between the valve member 76 and the end wall of the chamber 70 remote from the air inlet port 72 to resiliently urge the valve member 76 against a valve seat provided by the end wall of the housing 68 in which the air inlet port 72 is formed. The valve member 76 is moved away from its valve seat against the spring 78 to communicate the vacuum chamber 46 with the vacuum chamber 44 when the difference between the vacuum level $p_1$ in the first vacuum chamber 44 and the vacuum level $p_2$ in the second vacuum chamber 46 exceeds a predetermined value. In the illustrated embodiment of the invention, the relief valve 66 is arranged such that the valve member 76 is moved to its open position when $$P_1-P_2 \geqq -400 \text{ mmHg}.$$

The difference $P_1-P_2$ will be simply referred to as "pressure difference".

In operation, when the throttle valve 12 is abruptly moved from a wide-open position to the fully closed position, the vacuum in the intake manifold of the engine 10 is suddenly increased. It is to be noted that the intake manifold vacuum is of a vacuum level of higher than about $-200$ mmHg during a normal engine operation and is increased to a vacuum level of $-600$ mmHg when the engine operation is changed to deceleration operation (fully closed throttle position). In this change of the engine operation, the pressure difference ($P_1-P_2$) is not large enough to open the relief valve 66 and, thus, the anti-after burn valve 22 operates in the conventional manner. Namely, the pressure difference across the diaphragm 42 deforms the diaphragm downwards as viewed in FIG. 1 against the compression spring 58 to move the valve member 38 away from the valve seat 36 so that atmospheric air flows through the filter element 28, the air inlet port 26, the passage 34, the air outlet port 30 and through the air conduit 32 into the intake manifold 11 of the engine 10. The pressure difference across the diaphragm 42 is gradually decreased because the first and second vacuum chambers 44 and 46 are communicated with each other through the orifice 60. After the lapse of a predetermined time period from the opening of the valve member 38, the vacuum level in the second vacuum chamber 46 becomes equal to the vacuum level in the first vacuum chamber 44, so that the diaphragm 42 is moved by the spring 58 to the initial or normal position to lift the valve member 38 to its closed position. The larger the pressure difference, the longer the time period during which the valve member 38 is kept open.

When the engine is started, the pressure in the intake manifold of the engine is varied from the atmospheric pressure to a high vacuum level which is equal to from about $-450$ to $-480$ mmHg. This pressure variation causes a pressure difference across the diaphragm 42, the pressure difference being larger than the pressure difference at which the relief valve 66 is designed to be opened. Thus, as soon as the vacuum produced in the engine intake manifold is introduced into the first vacuum chamber 44 to move the valve member 38 to its open position, the valve member 76 of the relief valve 66 is moved to its open position against the spring 78 so that the vacuum is introduced from the first vacuum chamber 44 through the vacuum passage 64 into the second vacuum chamber 46 until the difference in pressure between the first and second vacuum chambers 44 and 46 is decreased and becomes equal to the pressure difference at which the relief valve is designed to be opened, to thereby allow the valve member 76 to be moved to its closed position by the spring 78. The valve open and closing operation of the relief valve 66 is completed in a short period of time. The difference in pressure between the first and second vacuum chambers 44 and 46 is then gradually decreased by the small orifice 60. The valve member 38 of the anti-after burn valve 22 is moved to its closed position after the lapse of a predetermined time period from the moment when the valve member 38 was opened. Thus, the valve open period during which the valve member 38 is kept open will be substantially constant irrespective of the magnitude of the variation in the vacuum in the intake manifold of the engine.

Figure 2:
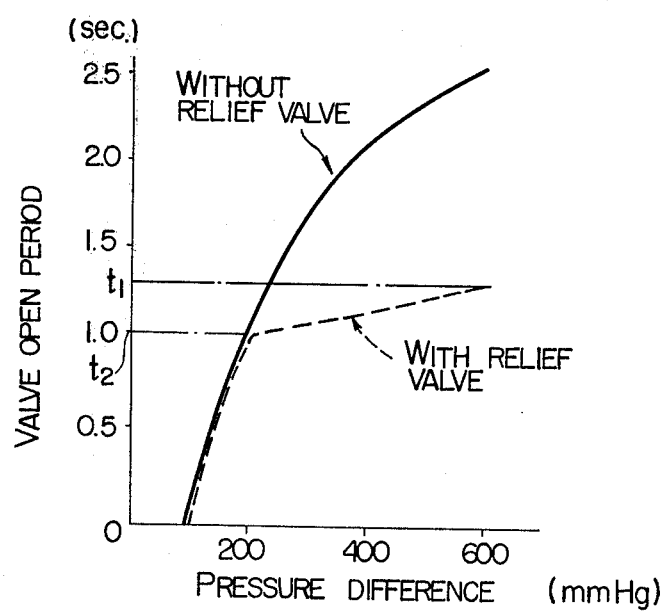
FIG. 2 is a graphical illustration of the operational characteristic of a modified embodiment of the anti-after burn system of the present invention.

FIG. 2 graphically illustrates the operational characteristic of another embodiment of the invention which is substantially similar to structure to the embodiment shown in FIG. 1 but is slightly modified such that the relief valve (66) is designed to be opened by the pressure difference ($P_1-P_2$) of approximately 200 mmHg. When the pressure difference is about 200 mmHg, the valve member 38 of the anti-after burn valve 22 is kept open for a time period of $t_2$, whereas the valve member 38 is kept open for a time period of $t_1$ when the pressure difference is 600 mmHg. The other embodiment is arranged such that the ratio of the valve open time period $t_1$ to the valve open time period $t_2$ is equal to or less than 1.5 (i.e., $t_1/t_2 \leqq 1.5$).

It will be also seen in FIG. 2 that, in a conventional anti-after burn system without the relief valve 66, the valve open time period is increased substantially in proportion to the pressure difference, as shown by the solid line curve in FIG. 2.

In the illustrated embodiment of the invention, the relief valve 66 is provided separately of the anti-after burn valve 22. However, the relief valve may alternatively be incorporated either into the cover member 40 of the anti-after burn valve 22 or into the housing 24 thereof. The orifice 60 may alternatively be provided in the valve member 76 of the relief valve 66 rather than in the diaphragm 42.

As described above, the anti-after burn system according to the present invention is operative to provide a valve open period which is varied dependent on the magnitude of the pressure difference so long as the pressure difference is less than a first predetermined value. The valve open period provided by the system of the invention, however, is made substantially constant irrespective of the magnitude of the pressure difference in the case where the pressure difference exceeds the predetermined value, to thereby improve the starting capability of the engine.

What is claimed is:

1. An anti-after burn system for an internal combustion engine having an intake system with a throttle valve disposed therein, said system comprising:

an air passage for feeding air into the engine intake system;

an anti-after burn valve means including a first valve seat provided in said air feeding passage, a first valve member disposed in said air feeding passage and a valve actuator having first and second vacuum chambers and a diaphragm disposed therebetween and operatively connected to said first valve member;

said first and second vacuum chambers being pneumatically connected to the engine intake system such that the intake manifold vacuum is introduced directly into said first vacuum chamber while the intake manifold vacuum is introduced into said second vacuum chamber through a restricted orifice so that a difference in pressure is momentarily produced between said first and second vacuum chambers when the intake manifold vacuum is varied;

said diaphragm being operative to move said first valve member to its open position when the difference in pressure between said first and second vacuum chambers exceeds a first predetermined value;

means defining a vacuum passage extending between said first and second vacuum chambers; and a relief valve means including a second valve seat provided in said vacuum passage, a second valve member disposed in said vacuum passage and a spring member normally urging said second valve member against said second valve seat, the arrangement being such that said second valve member is moved to its open position against said spring member to communicate said first vacuum chamber with said second vacuum chamber when said pressure difference exceeds a second predetermined value which is greater than said first predetermined value.

2. An anti-after burn system according to claim 1, wherein said restricted orifice is formed in said diaphragm and said vacuum passage extends in bypassing relationship to said orifice.

3. An anti-after burn system according to claim 1 or 2, wherein the arrangement is such that said relief valve is opened when said pressure difference exceeds 200 mmHg and such that the ratio of the time period during which said anti-after burn valve means is opened with said pressure difference being 600 mmHg to the time period during which said anti-after burn valve means is opened with said pressure difference being 200 mmHg is equal to or less than 1.5.

* * * * *